United States Patent [19]

Momiyama

[11] Patent Number: 4,571,050
[45] Date of Patent: Feb. 18, 1986

[54] LIGHT MEASURING DEVICE FOR CAMERA
[75] Inventor: Kikuo Momiyama, Kanagawa, Japan
[73] Assignee: Canon Kabushiki Kaisha, Tokyo, Japan
[21] Appl. No.: 611,412
[22] Filed: May 17, 1984
[30] Foreign Application Priority Data May 20, 1983 [JP] Japan ................... 58-88967

[51] Int. Cl.⁴ ............................................. G03B 7/099
[52] U.S. Cl. ..................................... 354/429; 354/478
[58] Field of Search .................. 354/429, 431–434,
354/476–483, 155, 219, 224, 225; 356/221, 222,
225; 250/216, 278

[56] References Cited
U.S. PATENT DOCUMENTS

| | | | |
|---|---|---|---|
| 3,232,192 | 2/1966 | Stimson | 354/432 X |
| 3,282,178 | 11/1966 | Nelson | 354/478 |
| 3,450,016 | 6/1969 | Yamada | 354/478 X |
| 3,575,095 | 4/1971 | Keck | 354/478 X |
| 3,884,584 | 5/1975 | Tsunekawa et al. | 354/478 X |
| 3,967,287 | 6/1976 | Kimura et al. | 354/478 |
| 4,309,093 | 1/1982 | Kuwayama et al. | 354/478 |
| 4,437,741 | 3/1984 | Sato | 354/479 |

Primary Examiner—William B. Perkey
Attorney, Agent, or Firm—Toren, McGeady, Stanger, Goldberg & Kiel

[57] ABSTRACT

A light measuring device for a camera has a light receiving photo-sensitive element, the light receiving surface of which is divided at least into two regions including a center part and a peripheral part and a diffusing member which is disposed in front of the photo-sensitive element and is arranged to have a diffusing surface formed solely in the peripheral area thereof. The light measuring operation of the device is arranged to be shiftable between one mode in which light measurement is carried out solely through the center part of the light receiving surface of the photo-sensitive element and another mode in which light measurement is carried out approximately through the whole light receiving surface.

7 Claims, 10 Drawing Figures

FIG.1
FIG.2
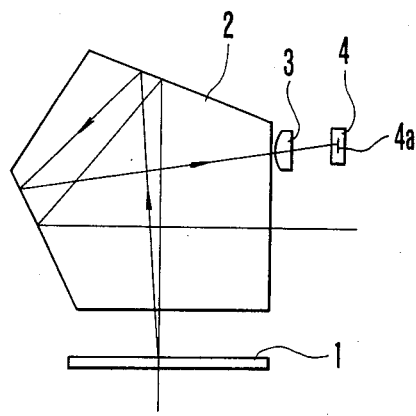
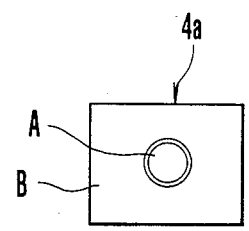
FIG.3
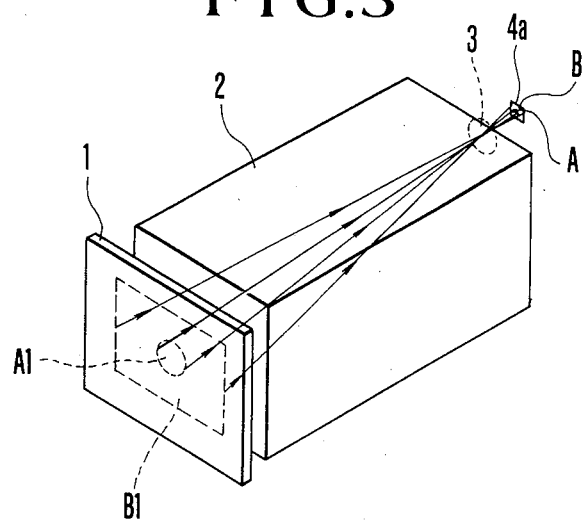
FIG.4
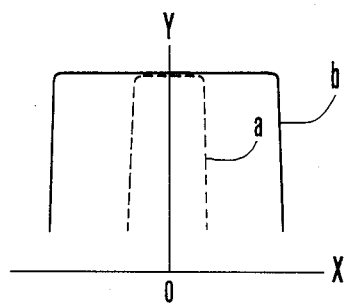

LIGHT MEASURING DEVICE FOR CAMERA

BACKGROUND OF THE INVENTION

1. Field of the Invention

This invention relates to a light measuring device for a camera having the photometric range thereof arranged to be shiftable.

2. Description of the Prior Art

The light measuring methods generally adopted for a camera can be roughly divided into an averaging photometry which measures the light of relatively wide area and a spot photometry which measures the light of a relatively narrow area. In the averaging photometry, since the average brightness of a wide area of an object to be photographed is measured, a stable light measurement value can be obtained when the object does not have much variations in local brightness. The averaging photometry, therefore, is suited for general automatic exposure photography. However, in the event of extreme difference in brightness between a background and a photographing subject, like in the case of a backlight shot, the optimum value of light measurement is very difficult to obtain. In the case of the spot photometry on the other hand, the optimum value of light measurement can be obtained for a photographing subject irrespective of the ambient brightness since light measurement is limited to a narrow range within the object to be photographed. While this is an advantage, the spot photometry is inapposite to general automatic exposure photography because the light measurement value varies to a great extent with variations in the object brightness.

Such being the merits and demerits of the averaging and spot photometric modes, it is desirous to arrange a light measuring device to permit selective shifting from one photometric range to another or between these different photometric modes according to the photographing conditions. In the light of this, there have been proposed various methods for effecting such switchover. The conventional known photometric range shifting methods include: A method in which the photometric range is shifted by mainly shifting the position of a photometric optical system to vary the imaging magnification thereof; and another method in which a light receiving photo-sensitive element which has its light receiving area divided into a plurality of photometric regions is used and the photometric range is shifted by selecting, according to the photographing conditions, the photometric regions of the light receiving surface of the element on which an object image is formed. However, the former method of shifting the photometric optical system causes the light measuring device to become complex and results in a larger size thereof. The latter method permits simple and compact structural arrangement as the photometric regions of the light receiving surface can be electrically switched over from one region to another. The latter method, however, presents a problem in that good photometric sensitivity distribution is not readily obtainable.

FIG. 1 of the accompanying drawings schematically shows the basic arrangement of the photometric optical system of the conventional single-lens reflex camera. An object image formed on a focusing plate 1 is arranged to be approximately formed on the light receiving surface 4a of a photo-sensitive element 4 by an image forming lens 3 through a penta-Dach prism 2. The light receiving surface 4a of the photo-sensitive element 4 is arranged as shown by way of example in FIG. 2. As shown, the light receiving surface is divided into a center region A and a peripheral region B.

FIG. 3 is a development view showing the image forming state of the photometric optical system shown in FIG. 1. The region A of the light receiving surface 4a corresponds to a relatively narrow range A1 located in the center part of the focusing plate 1 while the region B corresponds to a relatively wide range B1 on the focusing plate 1. Therefore, the spot photometry is performed by the output of the region A of the photo-sensitive element 4 and the averaging photometry by the output of both the regions A and B of the photo-sensitive element.

The photometric optical system, which is arranged as described above, has a photometric sensitivity distribution as shown in the graph of FIG. 4. In this graph, an axis X shows distances from a center O of the focusing plate 1 while an axis Y shows relative sensitivity obtained at each distance. A curve "a" represents photometric sensitivity distribution obtained by the spot photometry and a curve "b" photometric sensitivity distribution obtained by the averaging photometry.

As apparent from FIG. 4, a shortcoming of the conventional arrangement lies in that the photometric sensitivity distribution flattens over the whole light receiving surface of the photo-sensitive element in the case of the averaging photometry. As a result, the light measuring value becomes excessively responsive to the ambient brightness around the object to be photographed and thus becomes excessively affected by the background brightness for an ordinary object to be photographed. Generally, it is preferable for the averaging photometry to have the so-called center emphasizing photometric sensitivity distribution in which the sensitivity for the peripheral area of the object gradually lowers according as the distance of the peripheral area from the center part of the object increases.

SUMMARY OF THE INVENTION

It is an object of the present invention to provide a light measuring device for a camera which permits switchover between averaging and spot photometric modes.

It is another object of the invention to provide a light measuring device for a camera which permits shifting of photometric range with simple and compact structural arrangement and yet has a good photometric sensitivity distribution.

A feature of the light measuring device according to the invention lies in that the device has the light receiving surface area of a photo-sensitive element divided into at least two regions including a center part and a peripheral part; a diffusing member is disposed in front of the photo-sensitive element and has the center and peripheral parts thereof arranged to have different diffusing characteristics; and the photometric operation of the device is arranged to be shiftable between a photometric operation solely through the center part of the light receiving surface of the photo-sensitive element and a photometric operation with about the whole surface of the light receiving surface used.

These and further objects and features of the invention will become apparent from the following detailed description of the preferred embodiments thereof taken in connection with the accompanying drawings.

BRIEF DESCRIPTION OF THE DRAWINGS

FIG. 1 is a schematic illustration of arrangement of the photometric optical system of the conventional single-lens reflex camera.

FIG. 2 is a plan view of the light receiving surface of a photo-sensitive element.

FIG. 3 is a development view of the photometric optical system of FIG. 1.

FIG. 4 is a graph showing the photometric sensitivity distribution of the photometric optical system of FIG. 1.

DETAILED DESCRIPTION OF THE PREFFERRED EMBODIMENTS

Preferred embodiments of the present invention will be described in detail with reference to FIGS. 5 through 10 of the accompanying drawings.

Figure 5:
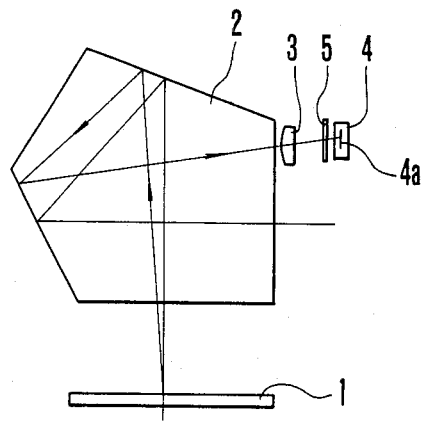
FIG. 5 is a schematic illustration showing a light measuring device arranged according to the present invention as a first embodiment thereof.
Figure 6:
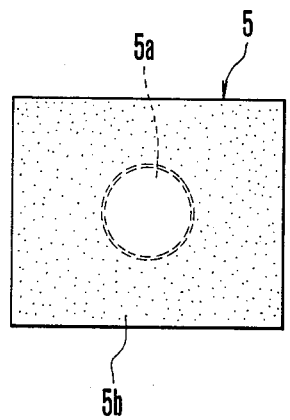
FIG. 6 is a front view of a diffusing member arranged according to the invention.

FIG. 5 shows the arrangement of a light measuring device as a first embodiment of this invention. The optical system of the first embodiment differs from that of the conventional camera shown in FIG. 1 in that a diffusing member 5 is inserted in between an image forming lens 3 and a photosensitive element 4. The diffusing member 5 has the center part and peripheral part thereof arranged to be of different diffusing characteristics. For example, as shown in FIG. 6, the center part 5a of the diffusing member 5 is transparent while the peripheral part 5b is arranged to perform a diffusing action solely on a part of a light flux incident on the peripheral part 5.

Figure 7:
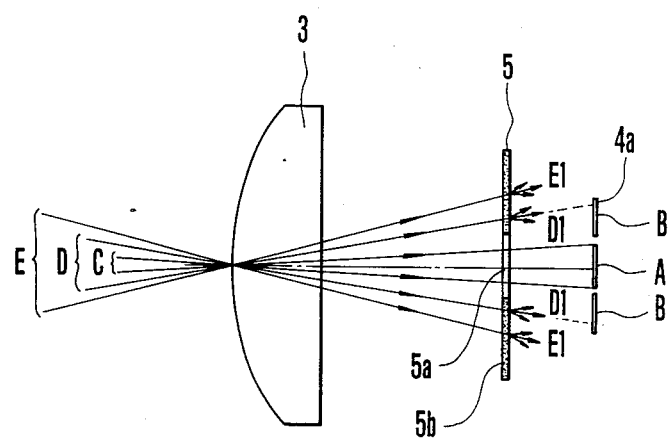
FIG. 7 is a schematic illustration of a photometric light flux obtained according to the invention.
Figure 8:
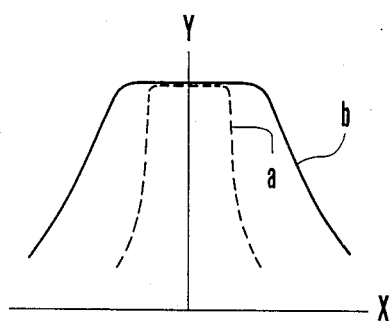
FIG. 8 is a graph showing photometric sensitivity distribution obtained according to the invention.

This action is as shown in FIG. 7. A light flux coming from the image forming lens 3 reaches the photo-sensitive element 4 via the diffusing member 5. A light flux portion C which is imaged on a center region A of the light receiving surface 4a of the photo-sensitive element 4 comes there by passing through the transparent center part 5a of the diffusing member 5 without being diffused. Another light flux portion D which is imaged on the peripheral region B of the light receiving surface 4a comes there after it has been diffused by the peripheral part 5b of the diffusing member 5 in a manner as represented by a diffused light D1. The diffused light D1 is partly diffused to the outside of the region B. Further, a light flux portion E is also diffused by the peripheral part 5b of the diffusing member 5 as represented by a diffused light E1. A portion of the diffused light E1 is diffused also to the light receiving surface 4a. The quantity of the diffused light incident on the light receiving surface thus decreases as it spreads farther in the peripheral region. The photometric sensitivity distribution of the averaging photometry thus is represented by a curve "b" of FIG. 8. Therefore, the photometric sensitivity distribution in the peripheral part 5b decreases with distance from the center part to give a good sensitivity distribution in the above-stated center emphasizing manner. In the spot photometry, since some portion of the light diffused in the peripheral part comes also to the region A of the light receiving surface 4a, the photometric sensitivity distribution in the center region is somewhat widened as represented by a curve "a" in FIG. 8.

In this specific embodiment, the size of the center part 5a of the diffusing member 5 is arranged to be a little larger than a range through which a light flux passes in the case of the spot photometry. This arrangement gives an advantage that an adverse effect of the widening sensitivity distribution can be decreased. Arrangement to make the area of the center part 5a smaller enhances the center emphasizing advantage for the averaging photometry, however, it results in a wider photometric range for the spot photometry. This problem may be solved by arranging the diffusing member 5 to be retracted from the photometric optical path at the time of the spot photometry. The diffusing member 5 may be made of a transparent glass or acrylic resin plate having the peripheral part thereof formed into a matted surface or a micro-prism surface or may be prepared by boring a hole in the center part of a diffusing member made of opal glass or the like.

Figure 9:
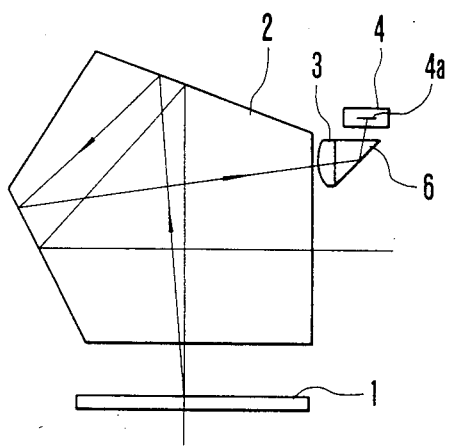
FIG. 9 is a schematic illustration of a light measuring device arranged according to the present invention as a second embodiment thereof.
Figure 10:
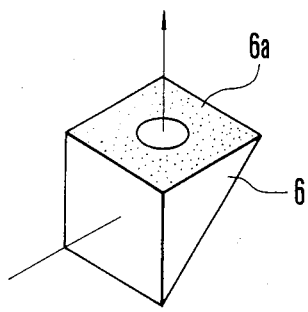
FIG. 10 is an oblique view showing a reflection prism arranged according to the invention as a part thereof.

FIG. 9 shows a second embodiment of the invention. In this case, a reflection prism 6 is disposed right behind the image forming lens 3. The photometric optical path is thus deflected and the photo-sensitive element 4 is disposed above the reflection prism 6. Referring to FIG. 10, the reflection prism 6 has its exit surface matted in the peripheral part thereof. In other words, a reflection prism and a diffusing member are formed in one unified body. The arrangement of this embodiment thus permits reduction in size and simplification of structural arrangement of the camera by lessening the backward protrusion of the camera body as the photosensitive element can be arranged above the prism. The structural arrangement of the embodiment can be further simplified by having the reflection prism 6 arranged in one unified body with the image forming lens 3.

Further, the invention is not limited to the embodiments described but many modifications and variations of these embodiments are possible. For example, the image forming lens 3 may be replaced with some other image forming element such as a Fresnel lens, etc. The position of the lens 3 may be changed to some other place in the rear of the exit surface of the penta-Dach prism 2. The shape and the number of divided regions of the photo-sensitive element 4 may be changed. The diffusing action of the diffusing member 5 may be varied for different parts thereof.

What I claim:

1. A light measuring device for a camera arranged to permit shifting of a photometric range thereof, comprising:
    a photo-sensitive element which is divided into two regions including a center part and a peripheral part; and
    a diffusing member divided into a center part and a peripheral part which are of different diffusing characteristics, said diffusing member being disposed in front of said photosensitive element.

2. A light measuring device according to claim 1, wherein said diffusing member has said center part arranged to be transparent and said peripheral part formed to be a diffusing surface.

3. A light measuring device according to claim 2, wherein the area of the center part of said diffusing member is larger than the area of the center part of said photo-sensitive element.

4. A light measuring device according to claim 1, wherein a light receiving lens is disposed in front of said diffusing member.

5. A light measuring device according to claim 1, wherein a triangular prism which has a slanting surface arranged to be a reflection surface is disposed in front of said photo-sensitive element; and said diffusing member is formed on at least one of the transmissive surfaces of said triangular prism.

6. A light measuring device according to claim 5, wherein a light receiving lens is disposed at a transmissive surface of said triangular prism other than the transmissive surface on which said diffusing member is formed.

7. A light measuring device according to claim 1, in which the size of said center part of said diffusing member is smaller than the size of said center part of said sensitive element, and said diffusing member is retracted out of the optical path at the time of partial light measurement.

* * * * *